United States Patent [19]

Berte

[11] Patent Number: 4,908,916

[45] Date of Patent: Mar. 20, 1990

[54] CONNECTOR PIN WITH SAFETY LOCK

[76] Inventor: Albert A. Berte, P.O. Box 51, Livermore, Iowa 50558

[21] Appl. No.: 307,045

[22] Filed: Feb. 7, 1989

[51] Int. Cl.⁴ ............................................. F16B 21/00
[52] U.S. Cl. ..................................... 24/453; 411/348
[58] Field of Search ............... 24/453, 122.3, 230 R; 411/348

[56] References Cited

U.S. PATENT DOCUMENTS

| | | | |
|---|---|---|---|
| 2,816,471 | 12/1957 | Bechman | 24/453 |
| 3,046,827 | 7/1962 | Myers | 24/453 |
| 3,085,462 | 4/1963 | Myers | 24/453 |
| 3,233,496 | 2/1966 | De Pew et al. | 411/348 |
| 4,120,232 | 10/1978 | Hoffman, Jr. | 411/348 |
| 4,198,080 | 4/1980 | Carpenter | 411/348 |

FOREIGN PATENT DOCUMENTS 0524297 8/1940 United Kingdom .................. 24/453

Primary Examiner—Victor N. Sakran
Attorney, Agent, or Firm—Zarley, McKee, Thomte, Voorhees & Sease

[57] ABSTRACT

A draw bar pin includes an annular groove at its lower end which receives a plurality of balls carried in openings in a lock sleeve. An actuator sleeve is movable between locked and unlocked positions, and when in the locked position, a cam shoulder holds the balls in the annular groove, and when in the unlocked position, they are free to move out of the groove for removal of the safety lock.

9 Claims, 1 Drawing Sheet

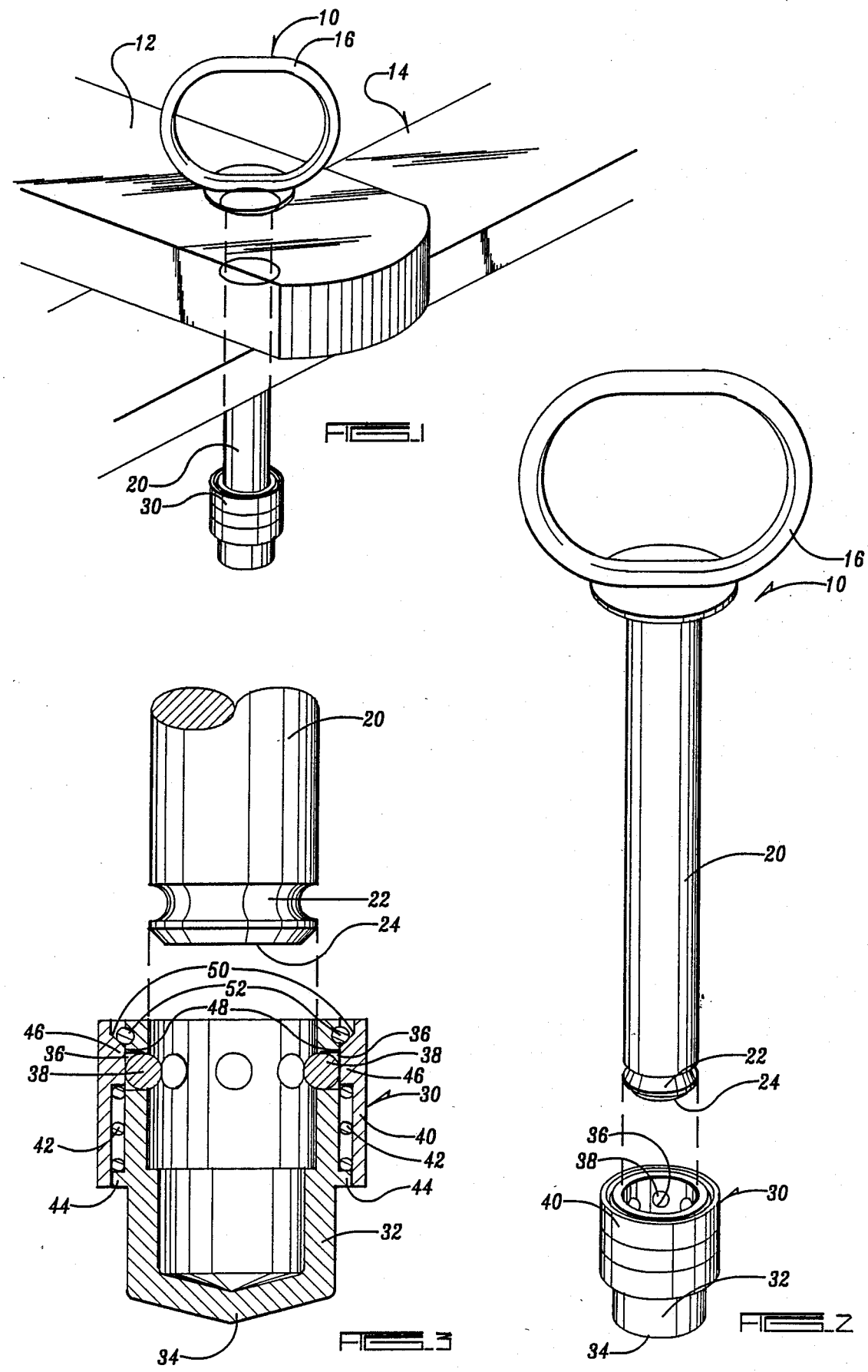

CONNECTOR PIN WITH SAFETY LOCK

BACKGROUND OF THE INVENTION

Connector pins have many uses including use on a tractor draw bar for connecting the tongue of a pulled wagon or the like to the draw bar. A common problem in the draw bar use is that the pin becomes disengaged from the draw bar by bouncing out or hitting rough terrain under the draw bar. A serious safety problem is created when this happens, as the towed vehicle will be released and will move out of control. It is thus seen that it is very important to have a lock means on the draw bar pin which is fool proof in operation, but is easy to put on and take off.

SUMMARY OF THE INVENTION

The connector pin of this invention may be used in connecting tongues to draw bars or for other more general purposes.

A safety lock is provided which is spring loaded to a locked position when on the connector pin. A plurality of balls are positioned in annular openings in a lock sleeve received on the free end of the pin such that the balls are received in an annular groove on the connector pin when the safety lock is in the locked position. An actuator sleeve having a cam shoulder is movable longitudinally of the pin between locked and unlocked positions, whereby the cam shoulder in the locked position holds the balls in the annular groove on the pin, and when in the unlocked position, the balls are free to move laterally outwardly out of the annular groove, thereby allowing the pin to be removed from the safety lock.

DESCRIPTION OF THE DRAWINGS

FIG. 1 is a fragmentary perspective view of the connector pin of this invention being used as a draw bar pin.

FIG. 2 is an exploded perspective view of the pin and safety lock.

FIG. 3 is an enlarged fragmentary view showing the safety lock in cross section.

DESCRIPTION OF THE PREFERRED EMBODIMENT

The connector pin of this invention is referred to generally in FIG. 1 by the reference numeral 10 and is shown connecting a tongue 12 to a draw bar 14.

The connector pin includes a head 16 in the shape of an eye which may be easily grasped by the hand for insertion into the tongue 12 and draw bar 14 and removed therefrom. The head is connected to an elongated cylindrical pin 20 having an annular concave groove 22 at its lower free end 24.

A safety lock 30 engages the lower free end 24 to hold the pin 20 against inadvertent removal from the tongue 12 and draw bar 14.

Safety lock 30 includes a lock sleeve 32 having a closed bottom end 34. A plurality of openings 36 are arranged annularly around the upper open end and receive balls 38 which have a size that permits them to move partially inwardly to be received in the annular groove 22 in the pin 20 when the safety lock 30 is locked on the pin 20. The balls 38 are large enough that they cannot pass all the way through the openings 36.

An actuator sleeve 40 is positioned on the outside of the lock sleeve 32 and is movable longitudinally between locked and unlocked positions. A coil spring 42 is disposed between the lock sleeve 32 and the actuator sleeve 40 and engages an annular shoulder 44 on the lock sleeve, and the bottom end of a cam shoulder 46 on the actuator sleeve 40 and normally biases the actuator sleeve to the locked position shown in FIG. 3. The cam shoulder 46 has a first portion 48 which has a surface parallel to the longitudinal axis of the pin 20, and when engaging the balls 38, holds them in an inward position as seen in FIG. 3, whereby the lock 30 is held on the pin 20 when the balls are in the annular groove 22. The shoulder 46 merges into a tapered second portion 50 which extends away from the pin 20, and when opposite the balls 38, allows them to move laterally outwardly when the actuator sleeve 40 is moved downwardly along the lock sleeve 32.

A retainer ring 52 is received in an annular groove on the upper end of the lock sleeve and engages the tapered second portion 50 of the cam shoulder 46 when the actuator sleeve 40 is in its locked position as seen in FIG. 3. The actuator sleeve 40 cannot be removed from the lock sleeve 32 without removing the retainer ring 52. The distance between the cam shoulder 46 and the annular shoulder 44 on the lock sleeve 32 limits the downward travel of the actuator sleeve 40 such that the balls 38 cannot move completely laterally out of the opening 36.

Thus, in operation it is seen that the safety lock 30 may be easily attached and removed from the pin 20 by simply sliding the actuator sleeve 40 downwardly along the lock sleeve 32, thereby allowing the balls 38 to move laterally outwardly to be received in the annular groove 22 on the pin 20. The actuator sleeve 40 is then allowed to move upwardly by the coil spring 42, whereby the balls are moved inwardly into the annular groove 22, and the safety lock 30 is positively locked in place making it certain that the draw bar pin will not inadvertently be removed from the tongue 12 and draw bar 14.

The safety lock 30 and head 16 define spaced apart stops for limiting longitudinal movement of the pin 20 relative to the tongue 12 and draw bar 14.

Again, when it is desired to remove the pin 20, all that is necessary is to again move the actuator sleeve 40 downwardly such that the balls may move outwardly against the tapered second portion 50 of the cam shoulder 46. This operation may be easily accomplished by one hand by placing the end 34 of the sleeve 32 in the palm of the hand and with the fingers on the actuator sleeve 40. The fingers pull the actuator sleeve 40 downwardly towards the palm of the hand, thereby moving the actuator sleeve from the locked position to the unlocked position.

I claim:
1. A connector pin comprising,
an elongated cylindrical pin having a head and a free end with an annular groove;
a lock means detachably connected to said free end, said lock means including a lock sleeve in which said free end is received, said lock sleeve having a side wall with a plurality of spaced apart annular openings;
an actuator sleeve in which said lock sleeve is received;
balls positioned between said lock sleeve and said actuator sleeve and in said annular openings, said balls having a size small enough to partially extend through said openings to be received in said annular groove in said pin;

said actuator sleeve having a cam shoulder means engaging said balls when in a locked position to hold them in said annular groove in said pin, said actuator sleeve being movable to an unlocked position where said cam shoulder allows said balls to move outwardly in said openings out of engagement with said annular groove; and said lock means and said elongated pin head defining spaced apart stops for limiting longitudinal movement of said elongated pin relative to a draw bar on which said elongated pin is adapted to be mounted.

2. The structure of claim 1 wherein said actuator sleeve is moved longitudinally of said pin between said locked and unlocked positions.

3. The structure of claim 2 wherein a spring engages said lock sleeve and said actuator sleeve to normally move said actuator sleeve to said locked position.

4. The structure of claim 1 wherein said lock sleeve includes a closed end extending over the free end of said pin.

5. The structure of claim 1 wherein said balls are large enough to not pass completely through said openings when said lock means is removed from said pin.

6. The structure of claim 1 wherein said cam shoulder includes a portion having a first portion in a plane parallel to the longitudinal axis of said pin and a tapered second portion extending outwardly away from said pin, whereby said first portion engages said balls in said locked position, and said second tapered portion engages said balls in said unlocked position.

7. The structure of claim 6 wherein an annular shoulder is provided on said lock sleeve and a coil spring is disposed between said lock sleeve and said actuator sleeve and between and in engagement with said annular shoulder and said cam shoulder to normally move said actuator sleeve to said locked position.

8. The structure of claim 7 wherein a retainer ring is positioned on said lock sleeve in engagement with said cam shoulder when said actuator sleeve is in said locked position thereby limiting the movement of said actuator sleeve in response to said spring.

9. The structure of claim 8 wherein said retainer ring is further defined as engaging said tapered second shoulder portion and said spring is further defined as engaging said first shoulder portion.

* * * * *